United States Patent [19]
Campbell et al.

[11] Patent Number: 5,995,676
[45] Date of Patent: *Nov. 30, 1999

[54] COMPARATOR-BASED THRESHOLDING METHOD FOR DETERMINING DATA VALUES

[75] Inventors: Scott Patrick Campbell, Chatham; Kevin Richard Curtis, Summit; Thomas J. Richardson, South Orange, all of N.J.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/777,154

[22] Filed: Dec. 26, 1996

[51] Int. Cl.$^6$ ...................................................... G06K 9/38
[52] U.S. Cl. .......................... 382/270; 382/271; 382/305; 341/131; 341/164
[58] Field of Search ..................................... 382/270, 271, 382/272, 305; 358/445, 465, 466, 444; 359/21; 341/131, 137, 164, 165

[56] References Cited

U.S. PATENT DOCUMENTS

| | | | |
|---|---|---|---|
| 4,064,484 | 12/1977 | Mese et al. | 382/272 |
| 4,084,153 | 4/1978 | Otten . | |
| 5,450,218 | 9/1995 | Heanue et al. | 359/21 |
| 5,455,873 | 10/1995 | Cameron, Jr. | 382/270 |
| 5,510,912 | 4/1996 | Blaum et al. | 359/21 |

FOREIGN PATENT DOCUMENTS

| | | | |
|---|---|---|---|
| 0201273A | 4/1986 | European Pat. Off. | G03H 1/26 |
| 0201273A3 | 4/1986 | European Pat. Off. | G03H 1/26 |
| 0418879A2 | 9/1990 | European Pat. Off. | G11B 7/00 |
| 0418879A3 | 9/1990 | European Pat. Off. | G11B 7/00 |
| 0692787A2 | 5/1995 | European Pat. Off. | G11B 20/10 |
| 0692787A3 | 5/1995 | European Pat. Off. | G11B 20/10 |

*Primary Examiner*—Scott Rogers
*Attorney, Agent, or Firm*—John M. Harman

[57] ABSTRACT

Embodiments of the invention include a method and apparatus for determining values for data reproduced or retrieved from data storage media such as in holographic memory systems. The method includes initially approximating the value of data members retrieved initially from the data storage medium of interest (e.g., by their intensity levels based on an absolute scale), using those approximations collectively to establish one or more threshold levels for defining ranges for the data values to be determined, and determining values for the retrieved data members by comparing the initial data value approximations of the retrieved data members to the established threshold levels. Alternatively, the threshold level(s) are set initially and adjusted iteratively based on the initial approximations of the individual data members until a final established threshold level is established. Advantageously, embodiments of the invention reduce data encoding overhead by using data members to establish comparative threshold levels for the determination of their intended values.

19 Claims, 3 Drawing Sheets

COMPARATOR-BASED THRESHOLDING METHOD FOR DETERMINING DATA VALUES

BACKGROUND OF THE INVENTION

1. Field of the Invention

The invention relates to data value determination. More particularly, the invention relates to determining the values of data retrieved from data storage devices such as holographic memory devices and other data storage media.

2. Description of the Related Art

Accurate retrieval or reproduction of stored data from data storage media has been important to the development of data storage systems such as holographic memory systems. Typically, a holographic memory or data storage system involves three-dimensional storage of holographic representations (i.e., holograms) of data members as a pattern of varying refractive index and/or absorption imprinted in a storage medium such as a crystal of lithium niobate. Holographic memory systems are characterized by their high density storage potential and the potential speed with which the stored data is randomly accessed and transferred.

When stored data is to be recalled, detector arrays are used for reading the information emerging from the memory pages. Typically, the recalled holographic information is projected onto an imaging unit such as a charged coupled device (CCD) or a CMOS detector array such as an active pixel sensors (APS), which are sensitive to the emerging optical information. A decoding unit coupled to the imaging unit then determines the corresponding values of the data initially encoded and holographically stored.

However, reproduction of stored data in holographic storage devices is less than ideal due to effects often inherent in holographic memory systems. For example, the number of data members imprinted in the storage medium typically is inversely proportional to the diffraction efficiency and thus the reliability of the holograms stored therein to be reproduced upon read out. Other factors often affecting the quality of the stored data include time-dependent fluctuations in light intensity throughout the storage medium, physical and optical disturbance of the mechanical relationship between system components, thermal expansion and other temperature-induced variations throughout the system, and other noise introduced into the system.

Because of the often poor quality in retrieving or reproducing such data, the value of a data member often is represented by comparisons of multiple data members. For example, it is possible to employ some sort of differential encoding scheme, in which a particular data value sought to be retrieved results from the comparison of one data member to another. Alternatively, it is possible to use a reference encoding scheme, in which the value of a data member is compared to one or more known reference data member values. See, for example, U.S. Pat. No. 5,450,218 and U.S. Pat. No. 5,838,469 entitled "Apparatus And Method For Processing Data Stored In Page-Wise Memory", filed on even date herewith.

However, such encoding schemes require the use of more than one data member to represent the data value of a single data member. For example, in typical differential encoding schemes, a single data value is based on the value of a first data member relative to a second data member. In this manner, two data members are needed to represent a single data value or data bit. Therefore, roughly half of the data members stored and retrieved from the storage medium are not actual data values but are "overhead" necessary for implementation of the encoding scheme. As such, the theoretical maximum data storage efficiency for conventional differential encoding schemes approaches approximately 50%.

In conventional local reference encoding schemes, an individual data value is based on the value of a first data member relative to one or more reference data members. In this manner, for every n data values represented, reference encoding schemes typically require at least approximately n+1, n+2 or even more data members. Thus, the data storage efficiency approaches $(n/(n+2))\%$ or $(n/(n+1))\%$. However, due to the inherent variations in holographic storage media discussed above, in practice n typically is kept small so that existing variations are somewhat consistent for both the reference data members and those data members being compared to the reference data members.

Therefore, although encoding schemes exist for improving data storage efficiencies among, e.g., holographic and other memory systems, a need still exists for reducing overhead among data members stored within and retrieved from data such storage media.

SUMMARY OF THE INVENTION

The invention is embodied in a method for reducing data encoding overhead for reproduction of data stored from data storage media such as in holographic memory systems and an apparatus for reading data stored in this manner. The method includes initially approximating the value of data members retrieved from the data storage medium of interest (e.g., by their intensity levels based on an absolute scale), using those approximations collectively to establish one or more threshold levels for defining ranges for various data values, and determining values for the retrieved data members by comparing the initial data value approximations of the retrieved data member values to the established threshold levels. Alternatively, the threshold level(s) are set initially and adjusted iteratively based on the initial approximations of the individual data members. In this manner, for applications such as determining data states for binary data members, the final established threshold level distinguishing a logical high from a logical low is not fully established until there are approximately an equal number of data members greater than and less than the adjusted threshold level. Advantageously, embodiments of the invention reduce overhead conventionally associated with data encoding schemes by using initial approximations of the data members to derive comparative threshold levels for the actual determination of the values of those data members.

DETAILED DESCRIPTION

Figure 1:
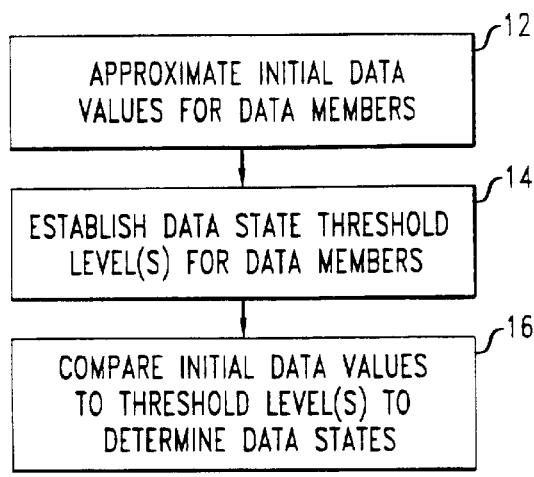
FIG. 1 is a schematic of a data value determination method according to an embodiment of the invention.

In the following description similar components are referred to by the same reference numeral in order to simplify the understanding of the drawings.

The invention is described primarily in terms of a particular embodiment, namely, value determination of data retrieved or reproduced from data stored in holographic memory systems. However, as will be appreciated by those skilled in the art, embodiments of the invention are understood to be suitable for use in other memory systems in which data typically is encoded by, e.g., differential, local reference or other encoding schemes.

Also, for purposes of clarity in describing embodiments of the invention, it should be noted that the pixel elements shown in the FIGs. (e.g., pixel elements $P_1$–$P_8$ shown in FIG. 2) depict data states as they are intended to be represented, not necessarily as they actually would be represented within a detector. As discussed previously, the representation of data states typically is inconsistent and oftentimes uncertain because of inherent inconsistencies that may have been present in the storage media from which the data was retrieved.

Figure 2:
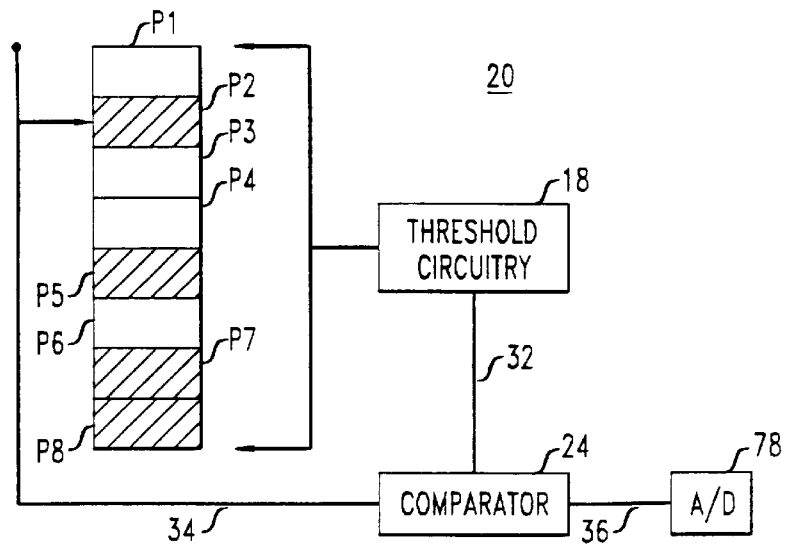
FIG. 2 is a schematic diagram of an apparatus for data value determination according to an embodiment of the invention.

For example, in FIG. 2, pixel elements $P_2$ and $P_3$ are shown as having different values or different data states. Such distinction is intended for purposes of explanation herein. However, in actual data retrieval applications, the different data state representation of pixel elements $P_2$ and $P_3$ may not be apparent from their data values individually or relative to one another.

As will be discussed in greater detail below, it is an object of embodiments of the invention to overcome such inconsistencies by providing for more accurate data representation. Therefore, embodiments of the invention will be described below assuming that not all of the data states depicted by the pixel elements are determinable, even though the FIGs. show them as determinable for purposes of discussion and explanation.

FIG. 1 schematically illustrates a data value determination method 10 according to an embodiment of the invention. FIG. 2 illustrates an exemplary apparatus 20 for performing data value determination methods such as method 10 shown in FIG. 1.

A first step 12 of method 10 involves approximating initial data values for data members. For example, in holographic memory systems, data retrieved or reproduced from the holographic data storage media is detected by the light-sensitive pixel elements of a sensor, such as a charged coupled device (CCD), a CMOS detector array such as an active pixel sensor (APS) or other appropriate device capable of reading out or detecting the stored data. The array of pixel elements within such a sensor typically is sensitive to the various data member light intensities emanating from the holographic storage medium and generates electrical or other signals corresponding to the various light intensities detected thereby. The generated signals exist as analog signals or, alternatively are converted to their corresponding digital value before further processing is performed.

For purposes of discussion herein, the terms "initial data value" or "approximated data value" are understood to include light intensities and/or electrical signal generated in response thereto by the individual pixel elements, as described below. The initial data value or approximated data value is understood to be distinct from the final data value as determined by embodiments of the invention, even though the initial data value and the final data value often turn out to be similar values.

In the example described herein, the initial, approximated data values are shown generally in FIG. 2 as a plurality of pixel elements $P_1$–$P_8$. Pixel elements $P_1$–$P_8$ represent, e.g., a corresponding plurality of data members $d_1$–$d_8$ (not shown) stored in a holographic storage medium. Pixel elements $P_1$–$P_8$ generate appropriate signals, e.g., electrical signals, corresponding to the light intensities of, e.g., data members $d_1$–$d_8$, emanating from a holographic storage medium.

In the example shown in FIG. 2, pixel elements $P_2$, $P_5$, $P_7$ and $P_8$ represent generally the light intensity of a first data state and pixel elements $P_1$, $P_3$, $P_4$ and $P_6$ represent generally the light intensity of a second data state. Although pixel elements $P_1$–$P_8$ are shown herein as representing only one of two data states, it is understood to those skilled in the art that conventional pixel elements are sensitive to varying degrees of light intensity to the extent that they are capable of representing one of a number of discrete data states as desired.

The next step shown in method 10 is the step 14 of establishing one or more data state threshold levels for the detected data members. In the specific example shown in FIG. 2, the values of pixel elements $P_1$–$P_8$ are used to establish a threshold level for distinguishing between those pixel elements representing a first data state (i.e., pixel elements $P_2$, $P_5$, $P_7$ and $P_8$) and those pixel elements representing a second data state (i.e., pixel elements $P_1$, $P_3$, $P_4$ and $P_6$).

As will be discussed in greater detail later, the threshold level(s) are used to define the acceptable ranges for various data states. For example, in a binary data system in which the pixel elements represent either a logical high ("1") or a logical low ("0"), a threshold level is established to distinguish pixel elements those representing a logical high and those representing a logical low.

Threshold level(s) are established, e.g., by a threshold circuitry 18, shown generally in FIG. 2. Threshold circuitry 18 has an input capable of reading the initial, approximated data value of a pixel element, e.g., the individual values of a plurality of pixel elements $P_1$–$P_8$. Threshold circuitry 18 is, e.g., a fabricated circuit device adapted for coupling to, e.g., a device having pixel elements $P_1$–$P_8$ formed thereon. Alternatively, threshold circuitry 18 is fabricated with pixel elements $P_1$–$P_8$ on the same device, e.g., on the same CMOS integrated circuit (IC) chip. For example, see generally co-pending application "Apparatus And Method For Processing Data Stored In Page-Wise Memory", Ser. No. 08/777,155, filed on even date herewith.

According to embodiments of the invention, the data member values are used to assist in establishing data state threshold level(s) rather than having threshold levels based on an arbitrary or absolute scales. Also, embodiments of the invention reduce the need for having dedicated pixel elements representing differential data values or local reference data values for comparison with pixel elements representing the actual user data.

It should be understood that conventional encoded data comprises both channel data and user data. User data is the actual data that subsequently is encoded for storage and decoded upon retrieval from storage. Channel data comprises user data along with non-user data such as encoding, error correction and/or control information data. In conventional data representation, more than one bit of channel data typically is required to encode one bit of user data.

Embodiments of the invention advantageously improve the percentage of the user data component within the channel data that is to be stored in and subsequently retrieved or reproduced from various data storage media. The improvement results from reducing the amount of non-user data attributable to data encoding.

Figure 3:
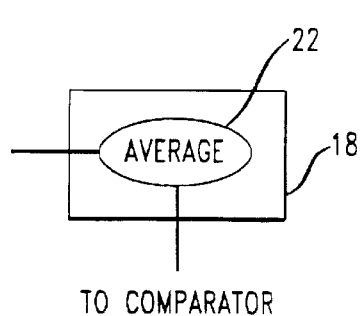
FIG. 3 is a schematic diagram illustrating threshold circuitry according to an embodiment of the invention.

Referring to FIG. 3, in one embodiment of the invention, threshold circuitry 18 includes an averaging circuitry 22, which determines the average value of the pixel elements of interest. For example, when used in the embodiment shown in FIG. 2, averaging circuitry 22 reads the initial, approximated data values of pixel elements $P_1-P_8$ and determines the average data value thereof. As shown, pixel elements $P_1-P_8$ represent either a first data state (e.g., pixel element $P_1$) or a second data state (e.g., pixel element $P_2$) and typically represent a sufficiently large and randomly neutral set of data states or are encoded (e.g., see U.S. Pat. No. 5,510,912) so that the number of pixels representing each state is approximately equal. Thus, the average value of pixel elements $P_1-P_8$ provides a suitable threshold level between pixel elements representing the first data state and pixel elements representing the second data state.

The next step shown in method 10 is the step 16 of comparing the initial, approximated data values resulting from approximating step 12 with the threshold level(s) established by establishing step 14 to determine the actual data states of the data members of interest. Such comparisons are performed, e.g., by a comparator 24 shown generally in FIG. 2.

Comparator 24 has a first input 32 connected to threshold circuitry 18 and a second input 34 capable of operable connection with the pixels of interest, i.e., pixels $P_1-P_8$ in the example shown in FIG. 2. In this manner, individual pixel elements are compared to the established threshold level.

If comparator 24 finds the initial approximated value of an individual pixel element to be, e.g., greater than the established threshold level, the individual pixel element is determined to represent, e.g., a first data state. Resultingly, comparator 24 outputs a signal indicative of such determination. Similarly, if comparator 24 finds the value of an individual pixel element to be less than the established threshold level, then the individual pixel element is deemed to represent, e.g., a second data state, and comparator 24 outputs a signal indicative of the second data state.

Comparator 24, which has an output 36, is configured in such a way that output 36 generates a signal clearly indicative of the appropriate data state being represented. Therefore, despite the quality of the pixel element representation of the value of data members stored in the storage medium of interest, the respective data states are readily determinable via comparison with the established threshold level(s) by comparator 24 and upon reading out the resulting output signal from output 36 of comparator 24.

Figure 4:
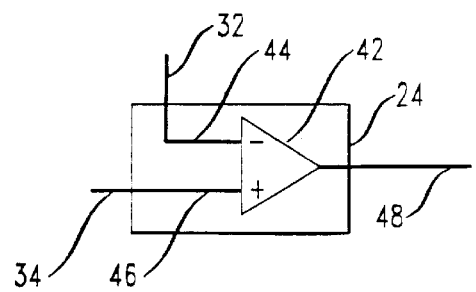
FIG. 4 is a schematic diagram illustrating a comparator according to an embodiment of the invention.

For example, as shown in FIG. 4, in one embodiment of the invention, comparator 24 comprises an analog comparator 42 having an inverting input 44, a noninverting input 46 and an output 48. As shown, inverting input 44 constitutes first input 32 connected to the output of threshold circuitry 18 and noninverting input 46 constitutes second input 34 connected to the pixel element of interest, i.e., the individual pixel element being compared. In a conventional manner, analog comparator 42 is configured to generate a first output value if noninverting input 46 is greater than inverting input 44 and to generate a second output value if inverting input 44 is greater than noninverting input 46. In this manner, comparator 24 outputs, e.g., a first data state if the pixel element of interest is greater than the threshold level and a second data state if the pixel element of interest is less than the threshold level.

Figure 5:
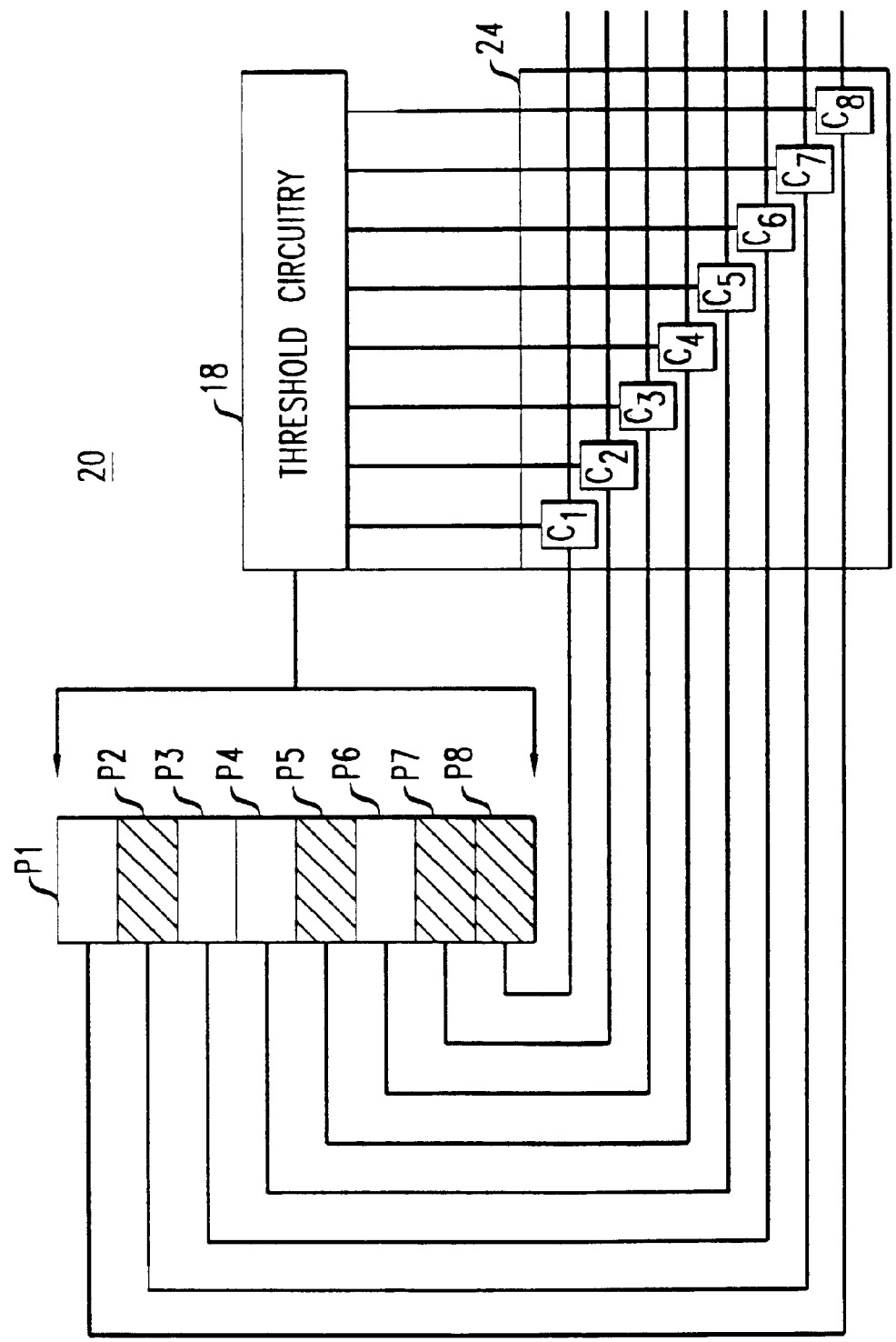
FIG. 5 is a schematic diagram illustrating a comparator according to an alternative embodiment of the invention.

Alternatively, comparator step 16 is performed using a plurality of comparators, thus allowing for comparisons between the pixel elements and the threshold level(s) to be made in parallel. For example, as shown in FIG. 5, comparator 24 comprises a plurality of comparators $C_1-C_8$ that are operably connected, e.g., correspondingly, to pixel elements $P_1-P_8$ in the manner shown. In operation, the individual comparators compare the initial, approximated data value of the respective pixel element to the established threshold level(s). The result of the comparisons, e.g., a first, second or other suitable data state output, is generated and output accordingly by the respective comparator outputs.

Although not shown in the FIGs., it is possible for comparator 24 and/or comparators $C_1-C_8$ to be fabricated on a single device (e.g., a single CMOS IC chip) for coupling to, e.g., a device having pixel elements $P_1-P_8$ formed thereon. Alternatively, $C_1-C_8$ are capable of being fabricated along with pixel elements $P_1-P_8$ on the same device, e.g., on the same CMOS IC chip.

Similarly, in yet another alternative arrangement, it is possible for threshold level establishing step 14 to be performed using a plurality of threshold circuits (not shown). In this manner, each individual thresholding circuit is operably connected to the pixel elements of interest (e.g., pixel elements $P_1-P_8$ in this example) so that an appropriate threshold level is determinable based on all the pixel elements of interest and is consistent among the plurality of threshold circuits.

In such an embodiment, it is possible and perhaps even advantageous to have the individual pixel elements, threshold circuitry and comparators fabricated on a single IC chip. Although having multiple thresholding circuits is somewhat redundant, in some applications such arrangement is more beneficial from the standpoint of IC fabrication demands and/or requirements than having a common thresholding circuit shared by the pixel elements of interest. Alternatively, the individual components are fabricated as desired on multiple chip devices capable of being coupled together.

In operation, once the data members of interest are detected (e.g., by pixel elements $P_1-P_8$), initial values for the data members are approximated. The initial, approximated data values are shown herein as being either clear and thus representing a first data state (e.g., see pixel elements $P_1$, $P_3$, $P_4$ and $P_6$) or being hatched and thus representing a second data state (e.g., see pixel elements $P_2$, $P_5$, $P_7$ and $P_8$). For example, the first data state is a logical low or "0" and the second data state is a logical high or "1".

However, it should be understood that, although in the example shown and described herein, pixel elements $P_1$, $P_3$, $P_4$ and $P_6$ represent a first data state and the pixel elements $P_2$, $P_5$, $P_7$ and $P_1$ represent a second data state, the respective data values of the pixel elements may differ greatly and may not necessarily coincide with any consistent scale. For example, if a range of values of a first group of pixel elements is characterized as varying between 0–10, the average value of the logical low pixel elements may be approximately 3.5 and the average value of the logical high pixel elements may be approximately 8.5, in which case a threshold level of approximately 5.0 is perhaps sufficient to distinguish logical low pixel elements from logical high pixel elements. However, within a similar group of pixel elements, the average value of the logical low pixel elements may be approximately 6.5 and the average value of the logical high pixel elements may be approximately 7.8, in which case a threshold level of approximately 5.0 is insufficient for distinguishing pixel elements having different data states.

Once the initial data values of pixel elements $P_1$–$P_8$ have been approximated, a suitable threshold level is established using threshold circuitry 18 in the manner described previously. As just described, a suitable threshold level for the pixel elements shown in the FIGs. would have a value somewhere between the average logical low value of pixel element $P_1$, $P_3$, $P_4$ and $P_6$ and the average logical high value of pixel elements $P_2$, $P_5$, $P_7$ and $P_8$.

After a threshold level is established (only one threshold level is needed in the example shown), the individual pixel elements are compared to the established threshold level by comparator 24. Output 36 of comparator 24 clearly indicates the data state represented by the individual pixel element. For example, if the pixel element representation of the data is characterized generally as varying between 0–10, then output 36 of comparator 24 would be approximately 0–1 for a first data state and approximately 9–10 for a second data state. Upon being output from comparator 24, the retrieved data is suitable for use in a conventional manner.

Figure 6:
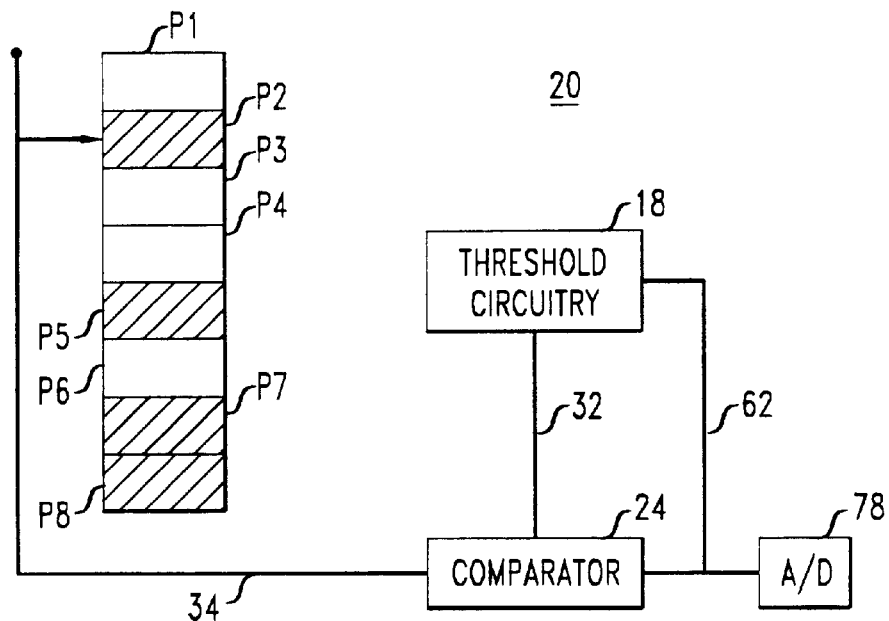
FIG. 6 is a schematic diagram of an apparatus for data value determination according to an alternative embodiment of the invention.

In an alternative embodiment of the invention, the threshold level(s) are established initially and then adjusted iteratively based on the initial, approximated values of the pixel elements of interest. For example, as shown in FIG. 6, threshold circuitry 18 relies on feedback (shown generally as 62) from comparator 24 in establishing threshold level(s). In this manner, for each threshold level to be established, an initial threshold level is set and then adjusted as individual pixel elements are compared thereto. The initial threshold level typically is set as or based on previously used threshold levels. Once a sufficient number of pixel elements have been compared thereto, the final adjusted threshold level establishes a level that adequately distinguishes pixel elements having, e.g., a first data state from pixel elements having a second data state.

Figure 7:
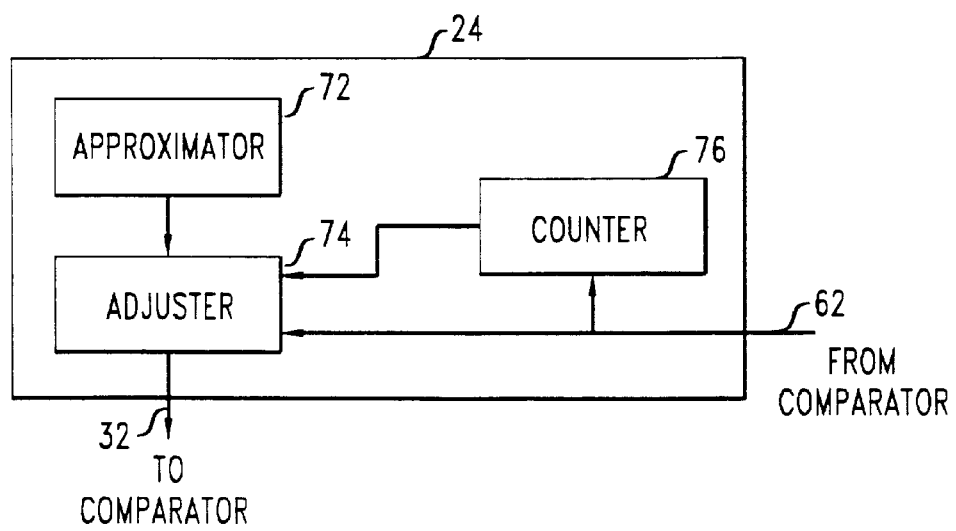
FIG. 7 is a schematic diagram illustrating threshold circuitry according to an alternative embodiment of the invention.

For example, as shown in FIG. 7, threshold circuitry 18 comprises a threshold level approximator 72 for setting the initial threshold level, an adjuster 74 operably coupled thereto as shown for adjusting the threshold level, and a counter operably coupled to adjuster 74. Both adjuster 74 and counter 76 are operably coupled to e.g., comparator 24 shown in FIG. 6 as shown.

The initially set threshold level is sent (without adjustment) to the comparator for comparison with a pixel element. The result of the comparison is read by adjuster 74 for appropriate adjustment of the threshold level prior to the next comparative iteration. Also, the result of the comparison is noted by counter 76, which assists in determining when no further adjustments to the threshold level are to be made.

As an example, the initial, approximated value of pixel element $P_1$ is compared with an initially set threshold level by the comparator. Because the initial, approximated value of $P_1$ in this example is shown as a clear pixel element, the comparator determines that pixel element $P_1$ represents a first data state (e.g., logical low or "0"). Adjuster 74 then adjusts the initially set threshold level accordingly, i.e., adjusts the initial threshold level lower to account for pixel element P, being read as a logical low. It should be remembered that the comparison just described is for the purpose of establishing an appropriate threshold level and is not for the purpose of determining the data state of $P_1$ or other pixel elements, which determinations are made once the appropriate threshold level is established.

The adjusted threshold level is then compared with the initial, approximated value of the next pixel element, $P_2$, and is adjusted accordingly based on the resulting data value determination of $P_2$. Concurrently, counter 76 is taking into account the number of pixel elements that are being compared to the threshold level and their respective data value determinations. When threshold circuitry 18 determines that a sufficient number of pixel element comparisons have been made and that the data value determinations made are not unreasonably skewed (i.e., the number of pixel elements having one data state is roughly similar to the number of pixel elements having another data state), adjuster 74 is disengaged and the final adjusted threshold level is used as the established threshold level. Once the threshold level(s) have been established in this manner, the alternative embodiment continues according to previous embodiments of the invention described herein.

As mentioned previously, although embodiments of the invention shown and described herein depict a binary data state arrangement (i.e., two possible data states), embodiments of the invention also are applicable in data storage arrangements where more than two data states are employed. In such cases, typically more than one threshold level is established. For example, if four possible data states are possible, then at least three threshold levels need to be established, i.e., a first threshold level to distinguish between the first and second data states, a second threshold level to distinguish between the second and third data states, and a third threshold level to distinguish between the third and fourth data states.

According to embodiments of the invention, it typically is not necessary to use encoding schemes in which data members are used for encoding purposes. Such encoding schemes include, e.g., differential encoding schemes, in which a single data value is represented by, e.g., a pair of pixel elements and whose value is based on the comparison of the first pixel element relative to the second pixel element. An alternative form of differential encoding, local reference encoding, involves representing a data values as the comparison of pixel elements to a designated reference pixel element.

According to embodiments of the invention, it is possible to represent, e.g., eight data members using only eight pixel elements, even though the quality of the data state information being represented by the pixel elements is not adequate to initially discern the intended data state representation. In this manner, the encoding efficiency is maximized, theoretically.

Although embodiments of the invention have been discussed in terms of performance within the analog domain, it clearly is within the scope of embodiments of the invention to include analog-to-digital conversion as desired. For example, it is possible to have analog-to-digital conversion of the information after it has been output from comparator 24. That is, for the embodiment shown in FIGS. 2 and 6, a single A/D converter 78 is connected as shown to output 36 of comparator 24. Furthermore, according to embodiments of the invention, an appropriate number of A/D converters are used as necessary, as would be known to those skilled in the art. For example, in the embodiment shown in FIG. 5, it is possible to connect A/D converters (not shown) to one or more or even all of the comparator outputs.

Also, although pixel elements are depicted herein in a manner that may suggest comparisons between adjacent pixel elements only, it should be noted that such requirement is unnecessary. Pixel elements are capable of being fabricated and/or operated in any desired arrangement within the data sensor device(s). Thus, for example, pixel element $P_1$–$P_8$ are randomly addressable and likewise are randomly comparable.

Also, because the storage of data within storage media such as holographic storage media often is less than consistent due to a number of inherent internal and external factors, activity such as automatic gain control (AGC) often is associated with data retrieval aspects of such memory systems. Automatic gain control detects, e.g., trends of data strength across the data image and normalizes the respective data values accordingly prior to or as the data values are being read out from storage medium 22. See generally, for example, co-pending application "Method For Modulating Data For Storage In Page-wise Memory", Ser. No. 08/777,153, filed on even date herewith and assigned to the assignee of this application.

However, embodiments of the invention are advantageous, e.g., in that the data determination activities described herein are performed independent of AGC activity. It is possible to incorporate AGC activity along with data retrieval according to embodiments of the invention to increase the overall accuracy of the system. That is, from the AGC (spatial) curve, it is possible to readily determine local normalization factors. Also, from the normalized profile, it is possible to readily determine variations between the normalized profile and the local reference pixels.

It will be apparent to those skilled in the art that many changes and substitutions can be made to the embodiments of the data value determination methods and apparatus herein described without departing from the spirit and scope of the invention as defined by the appended claims and their full scope of equivalents.

What is claimed is:

1. A method for determining the values of at least one of a plurality of optical data members retrieved from a data storage device, said method comprising the steps of:

approximating with a light-sensitive, optical sensor initial data values for the plurality of optical data members;

establishing at least one threshold level for the plurality of optical data members based on all the approximated initial data values of the plurality of optical data members; and comparing the initial data value of the optical data members to the threshold levels to determine the data value of the optical data members.

2. The method as recited in claim 1, wherein said establishing step further comprises determining the average value of said approximated initial data values, and wherein at least one of said threshold values includes the determined average value.

3. The method as recited in claim 1, wherein said establishing step further comprises establishing an initial threshold level and adjusting said initial threshold level based on said approximated initial data values.

4. The method as recited in claim 1, wherein said establishing step further comprises:

establishing an initial threshold level, increasing said initial threshold level when an approximated initial data value is greater than said initial threshold level;

decreasing said initial threshold level when an approximated initial data value is less than said initial threshold level; and repeating said increasing and decreasing steps until the number of said approximated initial data values above the adjusted threshold level is approximately equal to the number of said approximated initial data values below the adjusted threshold level.

5. The method as recited in claim 1, wherein said plurality of optical data members further comprise a plurality of holographic data members having varying data value intensities, and wherein said approximating step further comprises approximating initial data values for the data value intensities of said optical data members.

6. The method as recited in claim 1, wherein said comparing step is performed in the analog domain.

7. The method as recited in claim 1, wherein said comparing step is performed in the analog domain and wherein said method further comprises the step of converting the determined data member data values into corresponding digital data values.

8. The method as recited in claim 1, wherein said establishing step is performed in the analog domain.

9. The method as recited in claim 1, wherein said optical data members represent binary data states and wherein said determining step further comprises determining a data member to have a first binary data state if the initial value of said data member is greater than said threshold level and determining a data member to have a second binary data state if the initial value of said data member is less than said threshold level.

10. The method as recited in claim 1, wherein said optical data members are grouped into at least one group having at least n data members, and wherein said approximating step, said establishing step and said comparing step are performed for each of said groups.

11. Apparatus for determining the data states of data members stored in a holographic memory device, said apparatus comprising:

an array of pixel elements, said pixel elements detecting the light intensities of said data members retrieved from said holographic memory device;

threshold circuitry in operable connection with said pixel element array for establishing at least one data state threshold level, wherein the at least one data state threshold level is established based on all the detected light intensities of the plurality of data members; and at least one comparator having a first input in operable connection with said threshold circuitry and a second input capable of operably connecting to said array of pixel elements to compare said at least one data state threshold level with the detected light intensities of said data members to determine said data states, said comparator having an output for reading out said data states.

12. The apparatus as recited in claim 11, wherein at least one of said array of pixel elements, said threshold circuitry and said at least one comparator is fabricated on at least one CMOS IC chip.

13. The apparatus as recited in claim 11, wherein said threshold circuitry is an averaging circuit.

14. The apparatus as recited in claim 11, wherein said threshold circuitry includes a threshold approximator for approximating an initial threshold level, an adjuster for adjusting the threshold level, and a counter operably connected to said comparator output and said adjuster, said counter causing said adjuster to adjust said threshold level based on the number of data value intensities above the adjusted threshold level and the number of data value intensities below the adjusted threshold level.

15. The apparatus as recited in claim 11, where the second input of said at least one comparator is operably connected to said array of pixel elements.

16. The apparatus as recited in claim 11, wherein said threshold circuitry is coupled to said pixel elements for establishing said at least one data state threshold level based on the light intensities of said data members.

17. The apparatus as recited in claim 11, wherein said threshold circuitry is coupled to said pixel elements.

18. The apparatus as recited in claim 11, wherein said comparator further comprises at least one an analog comparator.

19. The apparatus as recited in claim 11, wherein said comparator further comprises at least one an analog comparator and wherein said apparatus further comprises at least one analog-to-digital converter operably connected to said output of said comparator.

* * * * *